(12) United States Patent
Salzhauer

(10) Patent No.: US 8,108,282 B2
(45) Date of Patent: Jan. 31, 2012

(54) FUNDING ACQUISITION OF UNIVERSITY AND NON-PROFIT PATENT PORTFOLIOS

(76) Inventor: Amy Salzhauer, Sidney, ME (US)

( * ) Notice: Subject to any disclaimer, the term of this patent is extended or adjusted under 35 U.S.C. 154(b) by 1122 days.

(21) Appl. No.: 11/246,899

(22) Filed: Oct. 6, 2005

(65) Prior Publication Data

US 2007/0083451 A1    Apr. 12, 2007

(51) Int. Cl.
  *G06Q 40/00* (2006.01)
(52) U.S. Cl. .................................. 705/36 R; 705/35
(58) Field of Classification Search .............. 705/35–38, 705/39, 40, 42, 1, 43, 44, 27, 30, 31; 235/375; 10/35–38
  See application file for complete search history.

(56) References Cited

U.S. PATENT DOCUMENTS

| | | | |
|---|---|---|---|
| 7,062,459 B1 * | 6/2006 | Herbst et al. | 705/37 |
| 2001/0034695 A1 * | 10/2001 | Wilkinson | 705/37 |
| 2002/0019793 A1 * | 2/2002 | Frattalone | 705/36 |
| 2005/0108136 A1 * | 5/2005 | Schneider | 705/36 |
| 2005/0256791 A1 * | 11/2005 | Schaub | 705/35 |
| 2008/0040250 A1 * | 2/2008 | Salter | 705/36 R |

OTHER PUBLICATIONS

Anonymous "Business Law Review for May 11-16, 2000" May 16, 2000 World News Connection vol. No. 20 (284).*
Anonymous "Newsbytes Law & Regulation Week in Review." Jun. 23, 2000 Newsbytes, p. NWSB00175021.*
Anonymous "Venable Adds Two Senior Washington Policy-Makers to Firm's Legislative Group; Heidi Stirrup, Former Senior Policy Advisor to House Majority Leader Dick Armey; Anne Keys, Former Top USDA executive and House Committee Aide for Natural Resources, Agriculture and Environment." Jan. 31, 2003 PR Newswire p. NYF02531012003.*

* cited by examiner

*Primary Examiner* — Kelly Campen
(74) *Attorney, Agent, or Firm* — Fish & Richardson P.C.

(57) ABSTRACT

A method for funding IP procurement for non-profits such as universities and other non-profits that conduct research, includes providing a fund to hold interests in intellectual properties of a non-profit organization, receiving investments from investors to add to the fund to fund acquisition of intellectual properties of the non-profit, by machine, storing information regarding the investments, intellectual properties, and the investors into a database and distributing shares in the fund according to the value of investments made in the fund.

35 Claims, 7 Drawing Sheets

FUNDING ACQUISITION OF UNIVERSITY AND NON-PROFIT PATENT PORTFOLIOS

BACKGROUND

Many universities and other non-profit organizations conduct important and basic research in a variety of technical areas. Often that research deals with patentable concepts. In some instances, the research is funded by outside sources such as private industry and/or government funding. Often however, the universities and non-profits conduct self-funded research. Given the financial environment for many universities, the ability of such universities to fund a patent program and obtain protection on their novel and non-obvious contributions is often limited.

SUMMARY

According to an aspect of the present invention, a method includes providing a fund to hold interests in intellectual properties of a non-profit organization, receiving investments from investors to add to the fund to fund acquisition of intellectual properties of the non-profit, by machine, storing information regarding the investments, intellectual properties, and the investors into a database and distributing shares in the fund according to the value of investments made in the fund.

The following embodiments are within the scope of the invention.

The method includes distributing shares in the fund to the non-profit and valuing the shares of the fund according to a value of assets in the fund. The method includes redeeming shares in the fund by the non-profit based on the valuation of the shares in the fund. The method includes donating investor shares in the fund to the non-profit, and receiving a confirmation of the donation and by machine storing information pertaining to the donation in the database to reduce the number of shares in the fund held by investors. The intellectual properties are patents. The method includes by machine executing a valuation program to value shares in the fund. The method includes generating an agreement between the investor and the university, the agreement being a legally binding document and by machine, storing the agreement in electronic form in a database. Producing the fund produces a first fund to fund intellectual property procurement over a specified first time period, and the method further includes producing additional funds that hold corresponding additional interests in additional intellectual properties of the non-profit organization obtained over corresponding, additional subsequent time periods and by machine, storing information pertaining to the funds in a database. Valuing includes by machine, determining a valuation of shares in the fund based on assets in the fund by executing a valuation model that applies valuation principles to the assets in the fund, and reporting information concerning the value of fund shares to investors in the fund. The method includes generating reports that renders information that includes the fund for which an investor has invested, a valuation of the shares in the fund, changes in ownership of shares in the fund; and profits generated by sales and/or licensing of intellectual properties in the fund.

Tax deductions accrue for the investor after receiving shares in the fund. Investors donate shares in the fund immediately after investing by the investor and tax deductions are based on an initial valuation of the shares in the fund that is related to the initial investment made by the investor. The intellectual properties of the fund are a right to receive royalties from licensing the intellectual properties. The non-profit organization is a college or university. The tax deductions can be taken by the investor after donating shares in the fund to the non-profit, based on a valuation that is determined at the time of donating the shares in the fund to the non-profit. The investor can donate shares in the fund after investing by the investor and tax deductions are based on an initial valuation of the shares in the fund that is related to the initial investment made by the investor.

The investor can donate shares in the fund after acquisition of intellectual property assets in the fund and after a valuation of the fund that is subsequent to the initial evaluation of the shares in the fund, and the tax deduction is based on the subsequent valuation of the shares in the fund, which is related to a value ascribed to assets in the fund.

According to an additional aspect of the present invention, a system for administering a funding mechanism for funding IP protection for a non-profit includes at least one computer configured to receive information regarding a fund to hold interests in intellectual properties of a non-profit organization; investments from investors to add to the fund to fund acquisition of intellectual properties of the non-profit; and to store information regarding the investments, intellectual properties, and the investors into a database.

According to an additional aspect of the present invention, a computer readable medium tangible embodying a computer program product including instructions stored thereon. The instructions when executed administering a fund that provides money to fund acquisition of intellectual properties of a non-profit. The instructions cause a processor to access information regarding a fund that holds interests in intellectual properties of a non-profit organization and investments from investors that are added to the fund to fund acquisition of intellectual properties of the non-profit. The program accesses a determined valuation of shares in the fund based on assets in the fund.

One or more aspects of the invention may provide one or more of the following advantages.

The invention provides a mechanism for private sources, e.g., investors to fund patent procurement and procurement of other intellectual property mechanisms for non-profit organizations. Funding of such procurement could result in large royalty incomes for universities that conduct successful research. At the same time, investors receive tax deductions, whose values fluctuate with changes in valuations of assets in the fund. Investors could take deductions at an initial stage that would correspond closely to the initial value of the investment or could take deductions that are far in excess of the initial value of the investments made by the investors, if the investors chose to hold the shares, and the underlying research and licensing efforts were highly successful, resulting in appreciation of the assets in the fund, as expressed through the periodic valuations of the fund shares.

DETAILED DESCRIPTION

Figure 1:
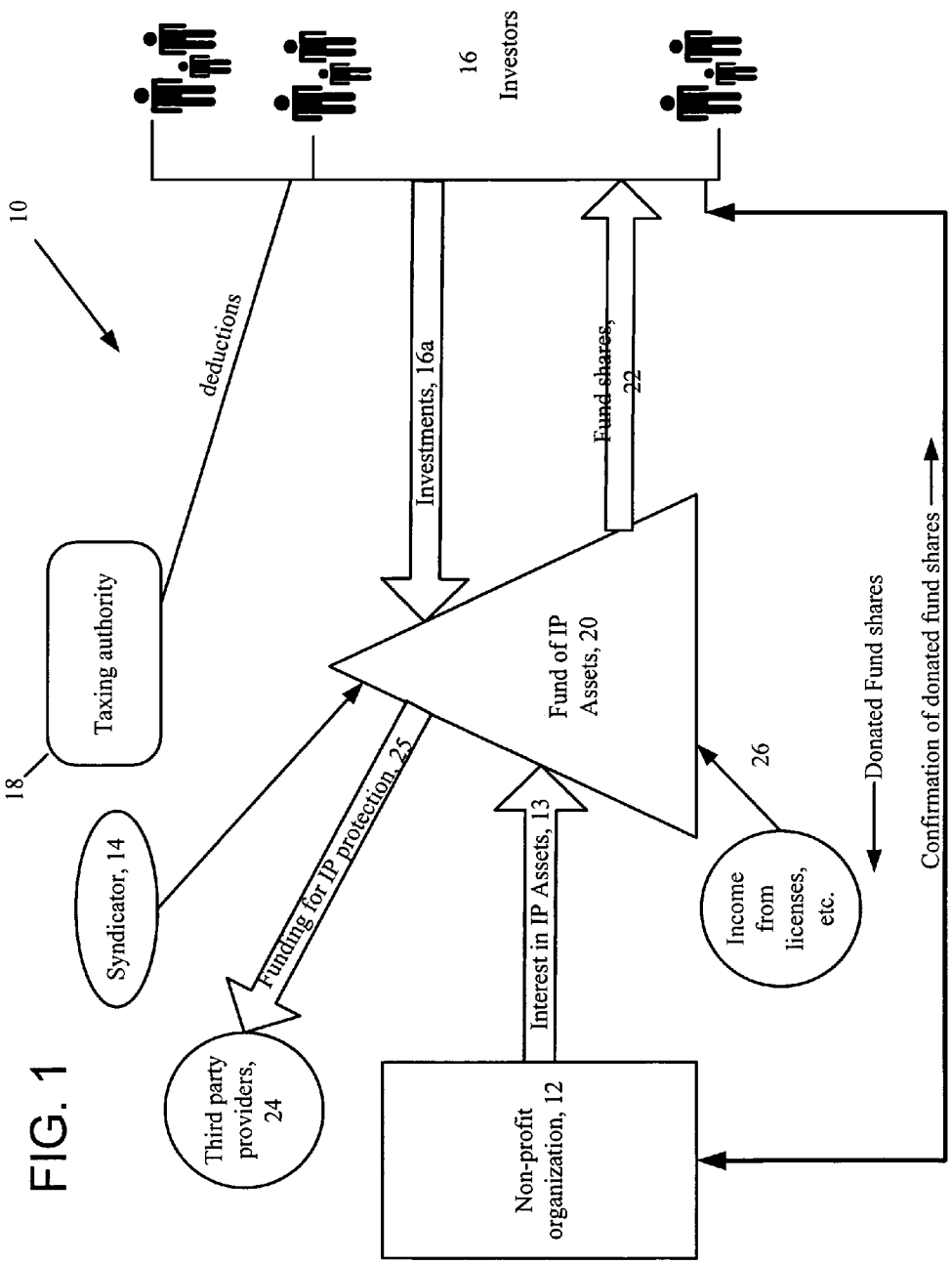
FIG. 1 shows a block diagram representing transaction flows in producing a fund.

Referring to FIG. 1, an IP funding program 10 provides funding for non-profit organizations 12 such as universities to procure intellectual property assets. The IP funding program 10 includes several parties: a syndicator 14; investors 16; the non-profit organization 12 and a taxing authority 18. The term 'syndicator' 14 refers to an entity that sets up and/or manages one or more funds (one fund 20 shown in FIG. 1). A non-profit 12 planning to fund research and seeking funding for patent or other intellectual property protection, contacts a syndicator 14 to set up fund 20. The fund 20 receives and holds interests 13 in the intellectual property assets generated by the non-profit organization 12 pertaining to the research of the university that is the subject of the program 10. Such interest could be the entire right, title and interest in the properties or at least a right, e.g., an exclusive right, to license the intellectual property. In some embodiments, the syndicator can have a more limited role. For example, the syndicator 14 can be a facilitator that sets up the initial fund 20 and lets the university manage the fund 20 or can teach the university how to set up the fund and fully perform the role of a syndicator 14, as described above. Thus, in some embodiments, the university or other non-profit can fulfill the role of a syndicator 14.

In general, the intellectual property rights held by the fund 20 would encompass all forms of intellectual property, but would most likely be patents and patent applications. Hereinafter, discussion of intellectual property rights will be directed towards patents and patent applications, although other types of intellectual property could be included.

Investors 16 are solicited by the syndicator 14 to fund patent procurement and licensing of university research. Specifically, many universities conduct research in which funding is secured through government contacts and the like. Some research is conducted by other funding sources. Often the funding is inadequate to fund efforts to protect intellectual property, e.g., patent developments that flow from that research. In some instances, the universities conduct self-funded research and do not have the funds to procure patent protection for the research. At the behest of the syndicator 14, the investors 16 provide investments 17 to the fund 20. The investments in the fund 20 are used by the universities to fund patent protection at least for work that is not otherwise funded. These investments are held by the fund 20. The fund 20, as mentioned above, also holds rights in certain non-profit developments. In return for funding of the patent protection for the non-profit, the investors 14 receive shares 22 in the fund 20.

Several approaches can be used to determine the initial number and value of the fund shares 22. For example, the syndicator 14 and the non-profit 12 enter into an agreement, in which the university would retain a percentage of the number of fund shares sold by the fund to investors 16. Thus, in one non-limiting example, the university 12 enters into an agreement in which the university agrees to place patent and patent application assets from specific research projects into the fund 20 and in exchange retain a percentage ownership in the fund shares, e.g., fifty percent (50%) of the shares 22 in the fund 20. The balance of the fund shares 22, e.g., fifty percent (50%) is held by the investors 16. Thus, for an initial investment 17 of $100,000 by investors 16, the investors would receive, e.g., 100 shares (each share being worth $1000) and the university would also own, e.g., 100 shares (each share being worth $1000). The university uses the funds 25 to pay fees of third party providers 24, (consultants, attorneys, governmental agencies, etc.) associated with securing intellectual property rights, e.g., patent rights.

With the help of a syndicator 12, investors 14 provide the non-profit 12 with funding needed to protect intellectual property assets in return for shares 22 in the fund 20 (or funds) produced to hold intellectual property assets. The shares 22 represent an interest in the fund and when donated back to the non-profit can be used to reduce the taxes that the investors 14 would otherwise pay in the future.

As the university 12 conducts covered research, and develops intellectual property, e.g., patent assets for the fund 20, the third party providers 24, the university and/or the fund syndicator markets those patent assets to raise licensing revenues or revenues from outright sale of the patent assets. As revenues 26 enter the fund, e.g., from licensees, etc. and the fund acquires other IP assets (additional patents and patent applications), and as the fund ages, these among other factors discussed below are used in valuation models to assign monetary values to the fund shares 22. Different valuation models may be used to value the fund shares corresponding to different stages of the fund. For example, a valuation model that heavily weights the valuation of the fund based on the initial investment in the fund would be used at the inception of the fund, a valuation model that weights the valuation of the fund less based on the initial investment and more based on the expenditures made in securing the assets may be used in a subsequent stage, whereas a valuation model that weights the valuation based on actual licensing revenues would be used at a later stage in the fund.

After the fund 20 is established and shares distributed to investors, the investors can use the shares 22 in various ways. The investors generally seek tax deductions. The investor can receive an immediate tax deduction by donating some or all of its shares back to the university at the initial formation of the fund 20. Alternatively, the investor can hold the fund shares 22 and periodically receive valuations for the fund shares 22. At any point, up to the time the fund ceases to operate (e.g., due to a termination event, e.g., abandoning of the intellectual property assets, expiration of the intellectual property assets and so forth), the investor can donate some or all of the shares back to the university and receive a tax deduction at a current valuation of the fund shares 22.

In one type of deduction, the deduction would be in the form of a charitable deduction that can be used to offset income. The taxing authority can be at any level of government, e.g., federal, state, county, or city level government that taxes income and allows for charitable deductions, with federal being an especially significant authority.

In addition to the fund having a termination date that ends with the enforcement rights of the patents, e.g., expiration of licenses or patents, the fund can have an end date that is at a fixed period, e.g., five years after filing of patent applications or granting of patents. In either event, the university would value the shares and notify investors that they need to take a deductions, as discussed below.

A syndicator 14 is an entity that works primarily as a middleman between investors 14 and universities 12 in the IP funding program 10. The syndicator's responsibilities include finding universities with research that could be used in a program 10, persuading investors 14 to invest in the funds in exchange for tax deductions 26, and underwriting agreements between universities 12, funds, 20 and investors 14.

A syndicator 14 may act as a clearing-house to assist investors by spreading their investment among many funds at many non-profits, e.g., universities, to diversify their deduction basis. A syndicator 14 might evaluate the feasibility of individual research organizations. Most large investors 14 would rather choose a syndicator 14 carefully and let the syndicator 14 study the individual funds 20. The responsibilities of the syndicator 14 can also include developing standard legal documents. Standardization of legal documents facilitates origination of the funds between universities 12 and investors 14 and helps to avoid problems with loopholes that might be present in individual or non-standard legal documents. Syndicators 14 might perform an asset management function on behalf of investors 14 to help detect and resolve problems expeditiously.

A syndicator 14 can pool IP properties from various universities into a fund to help make investing more efficient and enable safeguards to be built into the fund. The syndicator 14 frequently charges a fee or sets aside a small percentage of the investor's money as a fund reserve to be used to deal with unforeseen future problems. At initial stages the fee can be paid by the university out of universities share of funds, so as not to dilute the deduction value of the investments made by the investors, whereas at later stages, the fees can be taken out of profits generated by the fund and would be merely an expense that is considered in valuation of fund shares. Fund reserves might be held in addition to the fee but may be returned to the investor 14 in the form of fund shares if they are not used.

Syndicators 14 also ensure that the funds are audited and that the investors 14 receive accurate valuation information in time for their tax return deadlines. Syndicators 14 would preferably have the following capabilities: relations with universities 12 and links to a broad base of investors 14, preferably in collaboration with one or more financial intermediaries; legal documents that protect the investor 14 from risks and that protect the syndicator 14 from false claims by investors 14. A syndicator 14 would preferably have lawyers to negotiate final documents; and asset managers to oversee the progress of a fund and licensing professionals to exploit the intellectual property assets.

Of course, administrators that are set up by the syndicators 14 can carry out some of the day-to-day operations of the funds. After inception, the syndicators 14 can leave the fund to be operated by the administrator, which can be the non-profit, e.g., university itself.

Some benefits of the program 10 to universities include funding of patent protection for research in those situations where patent protection is either unfunded or under-funded, and concomitant therewith freeing funding for other purposes. In addition, the program enables universities to have the potential for significant future royalty income. For investors, the program gives them a mechanism to target funding of such efforts, while receiving immediate tax deductions, or deferred tax deductions that could significantly appreciate over the tax deduction potential of their initial investment.

Figure 2:
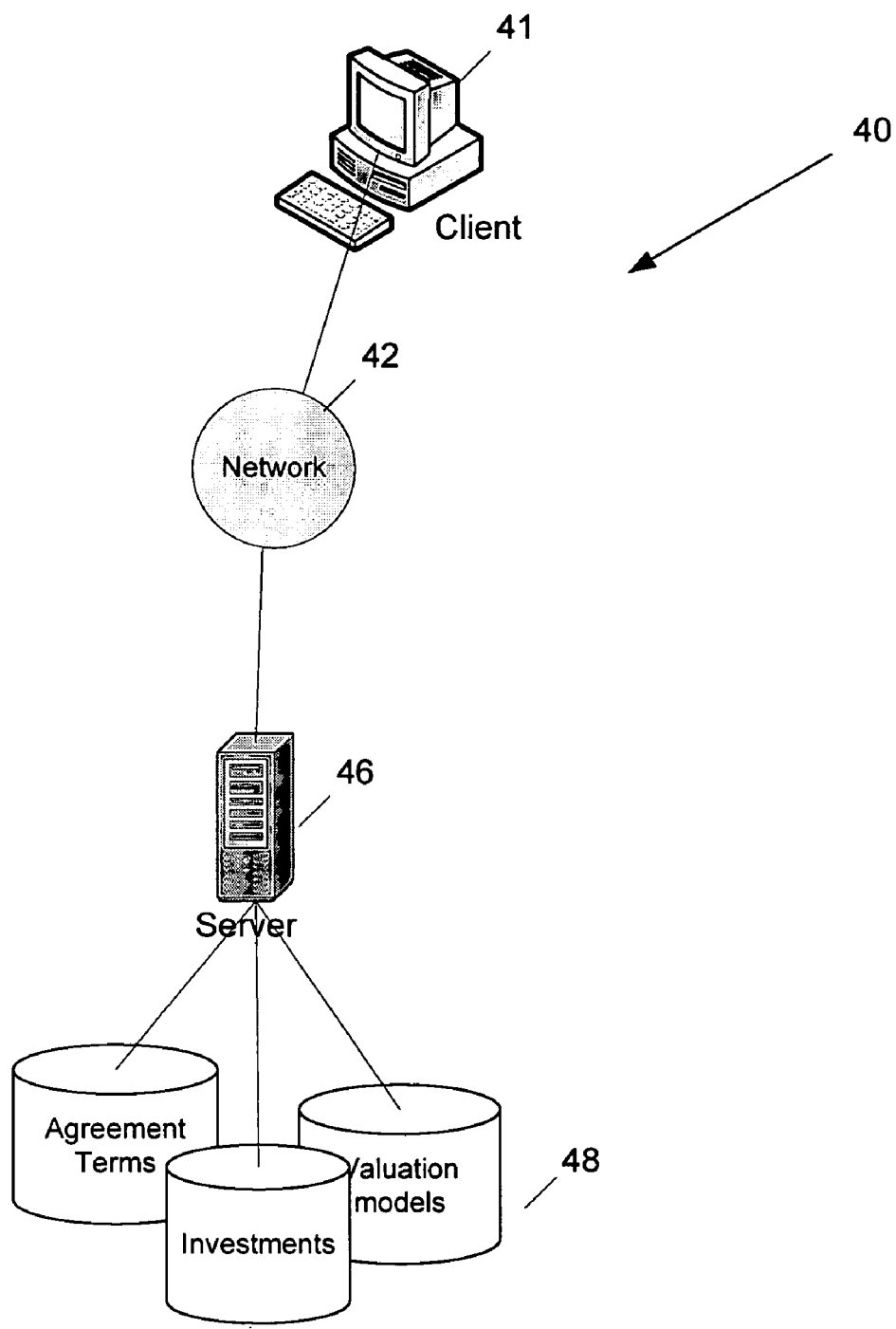
FIG. 2 shows a block diagram of a computing system that administers the fund of FIG. 2.

Referring to FIG. 2, a machine 40 embodied for example as a networked computing system is configured to administer the funding program 10. A user access databases 48 via a client computer 41 connected to a remote server 46 over a network 42. Multiple users could access the databases using multiple client computers or machines connected to the network 42. The users could be the non profit 12, syndicator 14, and investors 16. The non profit funding program 10 may be implemented using software operable on the remote server 46 and the client computer 41. The software causes the computing environment 40 to perform functions specified by the user. Such functions performed by the user could include searching Intellectual property allocated to the fund, allocating fund shares 26 to investors 14, storing agreements between the university and the syndicator and agreements between the university and investors 14, recording interest in the Intellectual property assets, e.g., patent assignments 28, tracking the Intellectual property assets, valuing fund shares, and generating custom reports.

In order to implement the non profit funding program 10, the software may access information related to agreement terms, investments amounts, licenses and records that pertain to income generated by the Intellectual Property assets stored in databases 48. The databases can be on the same remote server 46 as the software or a different remote server (not shown). In some implementations, the non-profit 12, syndicators 14, and can investors 16 can communicate with the server 46 over a network 46, for example, a direct dial connection, a local area network (LAN), a larger group of interconnected systems such as the Internet, a private intranet, or other similar wired or wireless network. Furthermore, the network 42 depicted is simplified for ease of explanation. The network 42 can include more or fewer additional elements such as networks, communication links, proxy servers, firewalls or other security mechanisms, Internet Service Providers (ISPs), gatekeepers, gateways, switches, routers, hubs, client terminals, and other network elements.

A suitable network protocol, such as the TCP/IP protocol, may be used for the communications. Communications through the network 42 may be secured with encryption, a security protocol, or other type of similar security mechanism. Communications through the network 42 can include any kind and any combination of communication links such as modem links, Ethernet links, cables, point-to-point links, infrared connections, fiber optic links, wireless links, cellular links, satellite links, and other similar links.

The client computer 41 or user may be any computer or computers used by those skilled in the art, and such client computers 41 may allow remote users to access the system 40. The client computer 41 may comprise a central processor unit (CPU) and main memory, an input/output interface for communicating with various databases, files, programs, and networks (such as the Internet), and one or more storage devices, such as a hard disk. The client computer 41 may also have a monitor or other screen device and an input device, such as a keyboard or a mouse. The client computer may also have some software programs contained in the main memory or the storage devices which can be used by the CPU. In one embodiment, a web browser, may be part of the software programs on the client computer 41. The central processing unit may use the browser software package to display information from a web page on a monitor.

The server 46 may comprise web servers and application servers or any combination thereof, and may be any computer known to those skilled in the art. The web servers and the application servers can be separate entities, or may exist within a single computer or computer system. The specification will refer to both possibilities as remote server 46. The server 46 allows access by the users to information stored in databases 48. Databases 48 could also be a single database. The server 46 may be separated and protected from the network 42 by a security mechanism such as a firewall. The server 46 may also have access, via the network 42, to external data sources.

Figure 3A:
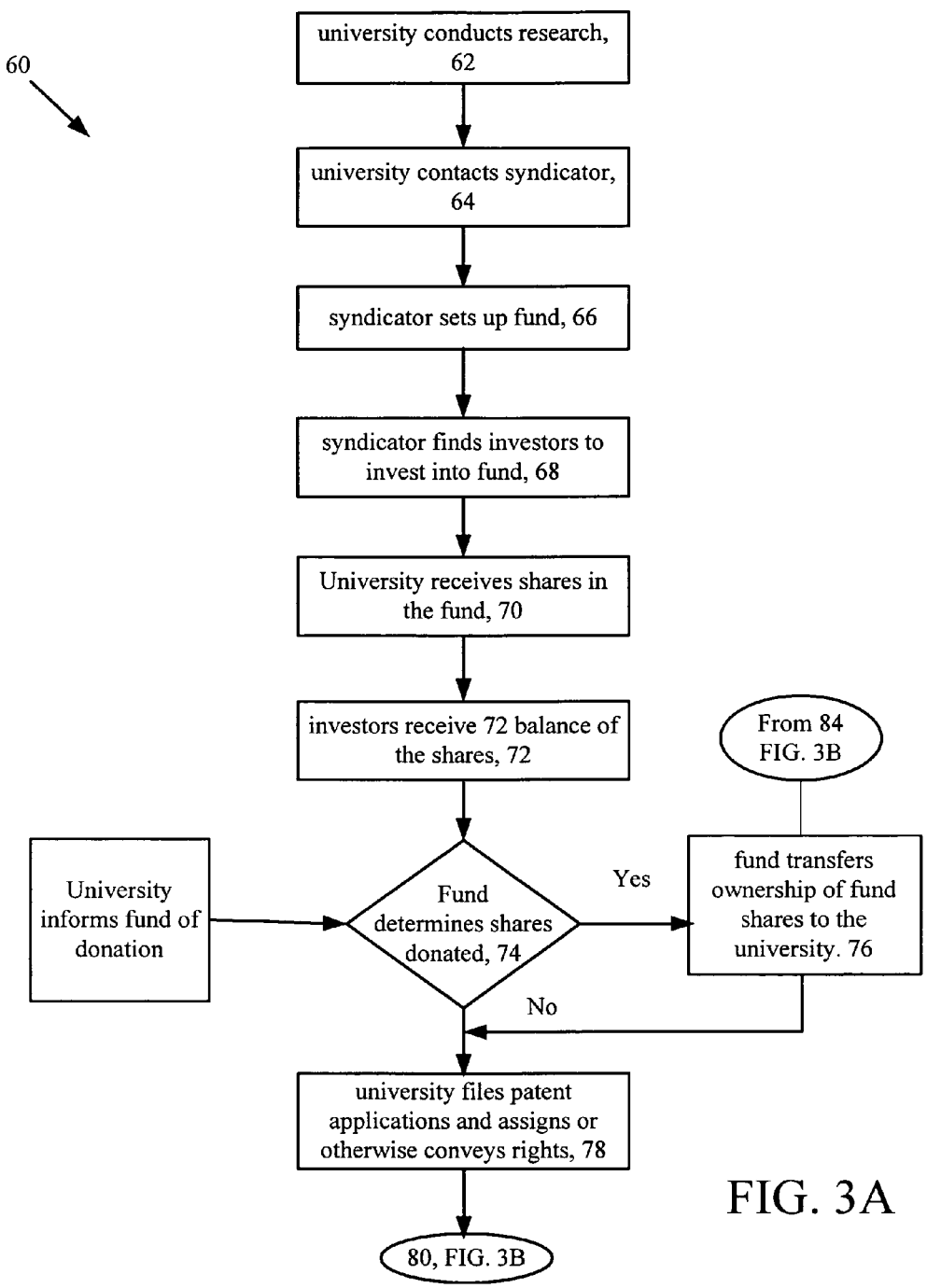
FIGS. 3A, 3B are a flow diagram of a fund administration process.
Figure 3B:
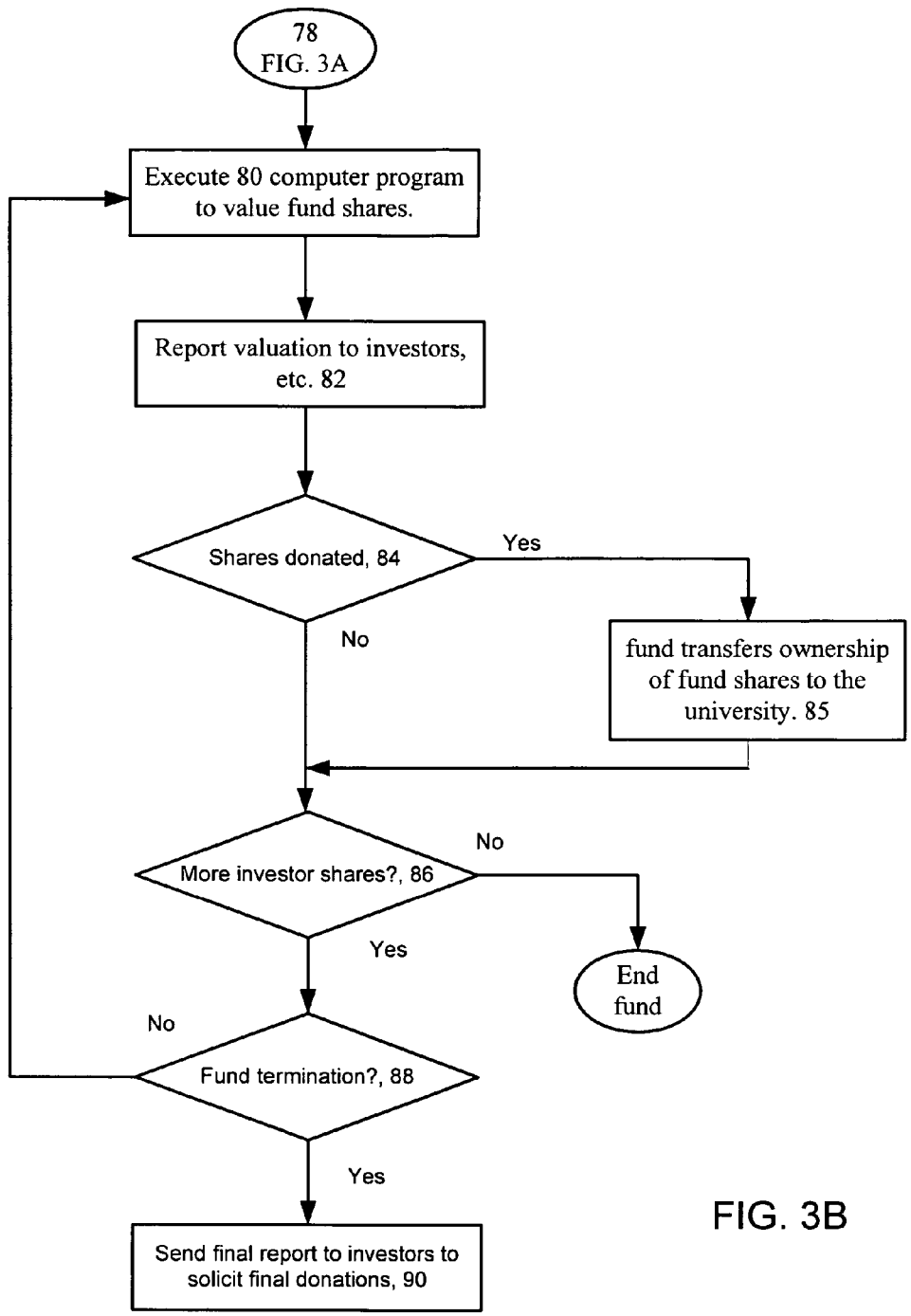

Referring to FIGS. 3A, 3B, an example of a process 60 for conducting the fund program 10 is shown. In this process 60, a university 12 plans to or conducts 62 research that is not sufficiently funded to secure patent rights. The university will own the entire right, title and interest in any patents or other intellectual property that results from the research, or at the very least the right to license such rights and assign such license rights to the fund. The university contacts 64 a syndicator 14, which in some embodiments can be the university or an arm of the university, or a third party. The syndicator 14 sets up 66 a fund, to secure and seek, e.g., patent rights. The syndicator finds 68 investors who invest, e.g., $100,000, into the fund set up by the syndicator 14. Since, the university's total costs for research and development likely would be in excess of the value invested by the investors 16, the university 12 receives 70 (in this example) fifty percent (50%) of shares in the fund, with the investors receiving 72 the balance of the shares. If the initial fund shares are 100, then each fund share would be valued at $1000 per share. In this example, the university's commitment of the Intellectual Property corresponds to in value that is equal to the value committed by the investors 14. At this point investors 14 can take a tax deduction (or tax credit discussed below) if the investors donated part or all of their shares back to the university. The program 10 determines whether any of the investors donated shares to the university 74. If a donation was made to the university, the donation is reported to the fund 20 by the university, so that the fund 20 can transfer 76 ownership of the fund shares to the university.

Thereafter, assuming that the syndicator receives 72 a five percent (5%) fee for placing the fund 20, in place and the syndicator 14 and/or the university 12 seeks patent protection for university sponsored research. The fund would have a total of $95,000 to fund the patent protection.

Thereafter, the university files patent applications and assigns or otherwise conveys rights 80 in the patent applications to the fund 20. Periodically, the fund administrator executes 82 a computer program on one of the computers discussed above to run a valuation mode to value the fund shares. The fund shares are valued to ascertain values of the shares for tax purposes. Several valuation models can be executed to establish valuations. Such models would be known to persons of ordinary skill in the art. Valuation models would take into consideration the stage of the fund 20. Typically valuations would take place once a year, e.g., at the close of the fund's tax year. The program can also determine a value of the assets in the fund based on economic valuation principles applied to the assets in the fund and reporting that information concerning the value placed on assets in the fund to the non-profit and to the investors in the fund. Reports that are generated can be displayed on client systems 41, as well as reported via e-mail, regular mail and so forth. The information would include the fund(s) in which an investor has invested funds into, the current valuation(s) of the share(s) received by the investors, historical valuation(s), changes in ownership of shares in the fund(s) and profits generated by sales and/or licensing of intellectual properties in the fund(s), as well as administrative expenses.

The fund 20 can be set up as a non-profit type entity, or as an entity that would not be responsible for tax payments.

Valuation models would consider factors such as an assessment of current inventory (jurisdictions, expiration dates, planned filings/protection, retention of license-back provisions), assessment of current inventory strength (e.g., detection of infringement, whether invention commands price premium over competition, alternate technology available, remaining useful life of technology, past licensing, operating profits from products/services employing IP, market share of products/services employing IP, barrier to entry, capital requirements relative to IP, bargaining power of customers and bargaining power of suppliers. Valuation companies using proprietary models customarily value IP assets and explanation of how IP is valued is not the purpose here.

As the IP assets, e.g., patent applications issue into patents, the assets age, and licensing revenues would also be taken into consideration. In any event, e.g., once a year the fund would publish 82 to its investors a valuation of the fund shares. At any point in the life of the fund, the investors could donate 84 any remaining fund shares to the university and take a tax deduction for the value of the fund shares, based on the current valuation at the time of donation. If shares are donated, the ownership in the shares is changed 85 to the beneficiary, e.g., the university. The process 60 determines 86 whether there are any more investor, non-donated shares. If there are no more, the fund can be terminated and any remaining assets in the fund can be conveyed to the university.

Alternatively, if there are more investor non-donated funds shares left, the process 60 determines 88 if the fund is at a fund termination event and if it is it sends 90 a final report to at least the remaining investors, indicating that a donation must be made in order to secure tax donations. If the process 60 is not at a fund termination event, the process 60 determines a new valuation. However, the valuation can await the end of tax year, it need not be done each time fund shares are donated, although that is certainly one way in which the fund can be operated.

In order to secure all funds in the fund for the university the agreement between the university and the investors can specify that at final valuation all fund shares are automatically conveyed to the university and a final report is prepared and sent to the investors for tax purposes.

The university can redeem either its shares or donated shares for cash from the fund. Redemption would be conducted using sound financial principals ensuring that sufficient cash reserves remain to secure and maintain any intellectual property held by the fund. Of course, at the end of the fund, (e.g., fund terminating event or receipt of all investor shares) any remaining assets (IP and cash) in the fund would be transferred to the university.

For research that was not successful, the fund shares could be worth less than the original value of the investment made by the investors, if the investors chose to hold the shares, whereas for research and licensing efforts that were highly successful, the investors could receive tax deductions far in excess of the initial value of the investments made by the investors, due to appreciation of the assets in the fund as expressed through the periodic valuations of the fund shares.

A non-profit, e.g., university can have one or more outstanding funds 20 at any given time. Administration of a fund 20 would be simplified if the funds were closed to new investment on a periodic basis, e.g., annually. In other embodiments, the funds can remain open, seeking new investors if and when additional funding is needed to procure intellectual property protection. In this manner, investors who elected to hold on to shares can delay taking the tax deductions for an extended period of time, since it is less likely that a fund terminating event would occur. It is also on average more likely that the value of the shares and hence value of the deductions would increase. Such a type of fund could be considered a revolving type fund, the details of which are discussed below.

Figure 4A:
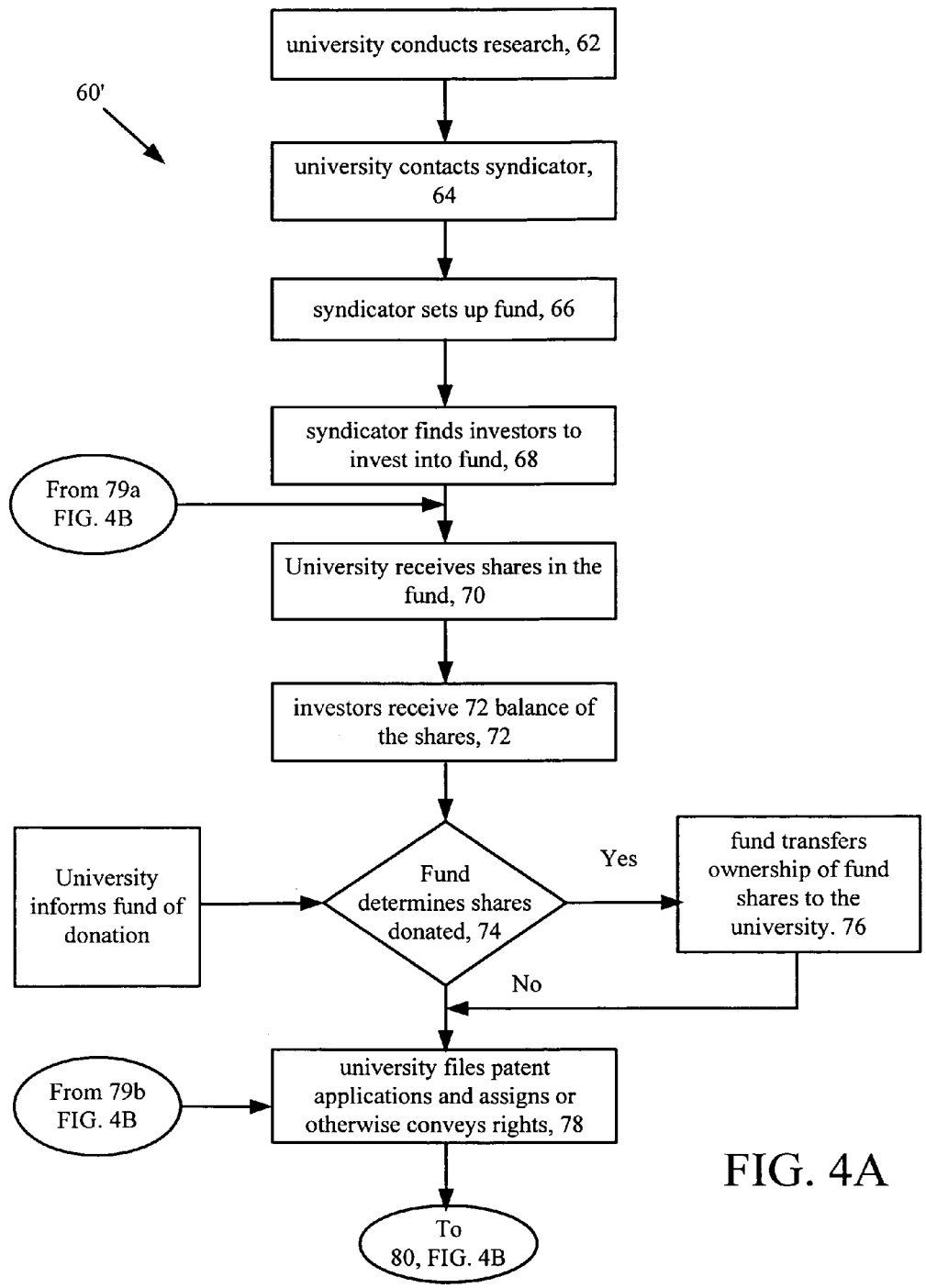
FIGS. 4A, 4B are a flow diagram of an alternate fund administration process.
Figure 4B:
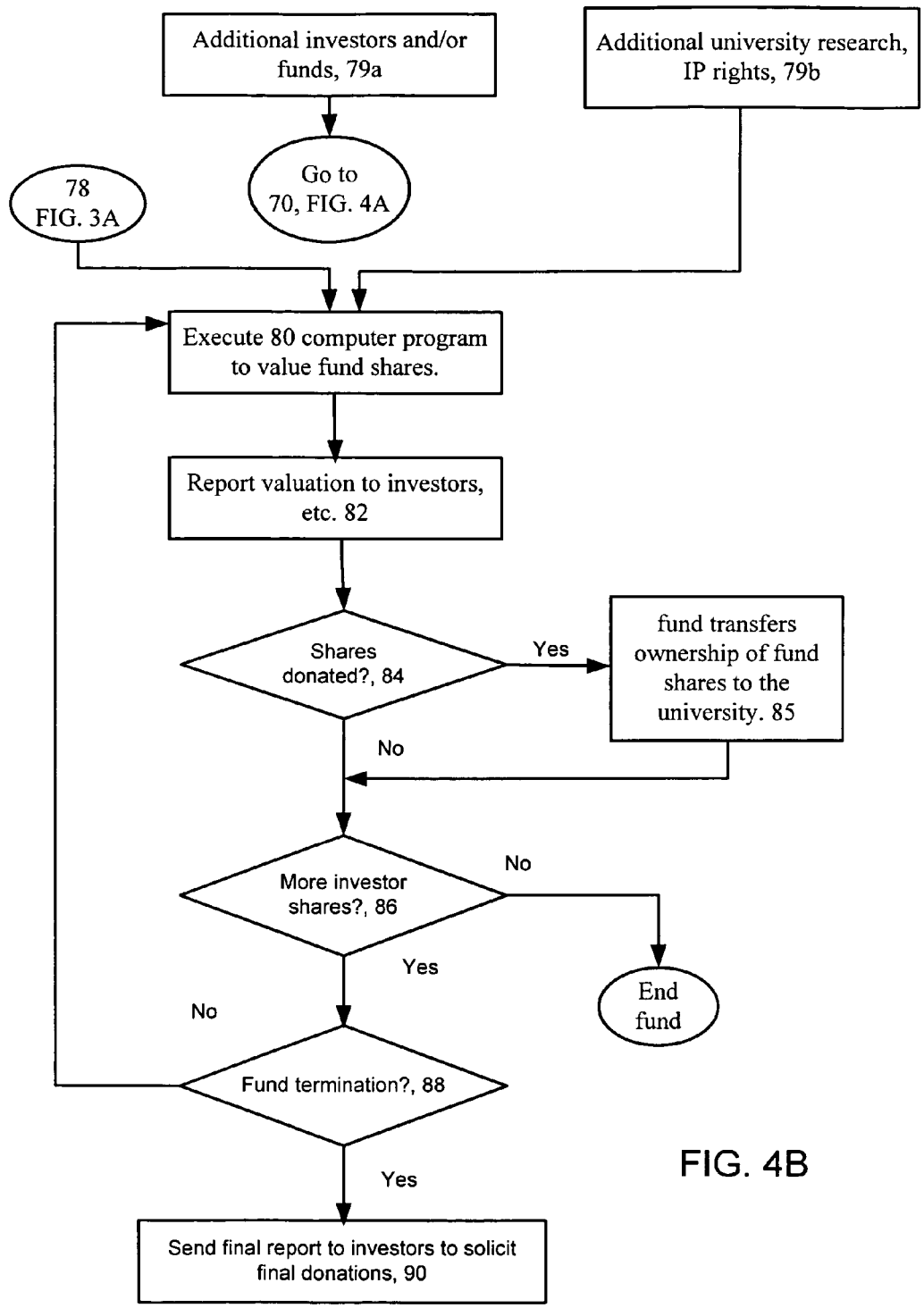

Referring to FIGS. 4A, 4B, an alternative embodiment 60' of a process for conducting the fund program 10 is shown. In this embodiment, the fund 20 is a revolving type of fund, with no specified termination date. In this example, a university 12 plans to or conducts 62 research that is not sufficiently funded to secure patent rights, contacts 64 a syndicator 14, which sets up 66, as discussed in FIGS. 3A, 3B. The syndicator finds 68 investors and the university 12 receives 70 a percentage of shares with the investors receiving 72 the balance of the shares. The program 10 determines whether any of the investors donated shares to the university 74. If a donation was made to the university, the donation is reported to the fund 20 by the university, so that the fund 20 can transfer 76 ownership of the fund shares to the university. The syndicator receives 72 a fee for placing the fund 20 and the syndicator 14 and/or the university 12 seeks patent protection for university sponsored research.

Thereafter, the university files patent applications and assigns or otherwise conveys rights 80 in the patent applications to the fund 20. Periodically, the university conducts new, different research and generates new, covered IP, e.g., patents whose rights are transferred by university to the fund 20. New valuations are determined based on valuation models, e.g., as discussed above. In addition, periodically the fund can receive additional donations from existing and/or new investors and issue additional fund shares. Thus, along with any new IP added to the fund, the fund shares are revalued.

The fund administrator executes 82 a computer program on one of the computers discussed above to run a valuation model to value the fund shares. The fund shares are valuated to ascertain values of the shares for tax purposes, as discussed above. The valuation models unlike the example discussed above would taken into consideration the new donations and the new IP added to the fund, e.g., the revolving nature of the funding process 60'.

As the IP assets, e.g., patent applications issue into patents, the assets age, and licensing revenues would also be taken into consideration. In any event, e.g., once a year the fund would publish 82 to its investors a valuation of the fund shares. With the revolving type of fund, generally there may not be any specific type of terminating event. Although, the fund could be terminated if all investor shares had been donated. At any point in the life of the fund, the investors could donate 84 remaining fund shares to the university and take a tax deduction for the value of the fund shares, based on the current valuation at the time of donation. If shares are donated, the ownership in the shares is changed 85 to the beneficiary, e.g., the university. The program 60' determines 86 whether there are any more investor, non-donated shares. If there are no more, the fund can be terminated and any remaining assets in the fund can be conveyed to the university. Even this type of revolving fund could have terminating events 88 if desired.

If the process 60 is not at a fund termination event 88, the process 60 determines 80 a new valuation. If the fund has no more outside investors or reaches a terminating event, a final report can be generated 90, as discussed above. However, as discussed above, the valuation can wait until the end of a tax year as with the report. Also, the valuation need not be performed each time fund shares are donated, although that is certainly one way in which the fund can be operated. Thus, any time period can be chosen to value the fund shares.

The revolving type of fund has additional benefits for investors. As with the previous embodiment, for research that was not successful, the fund shares could be worth less than the original value of the investment made by the investors, if the investors choose to hold the shares, whereas for research and licensing efforts that were highly successful, the investors could receive tax deductions far in excess of the initial value of the investments made by the investors, due to appreciation of the assets in the fund as expressed through the periodic valuations of the fund shares. However, since the fund is a revolving type of fund the risk of failure of university or other non-profit research is minimized. That is, because the fund will cover many different research projects possible in a variety of fields, and thus the risk of failure is averaged out over all of those projects.

Figure 5:
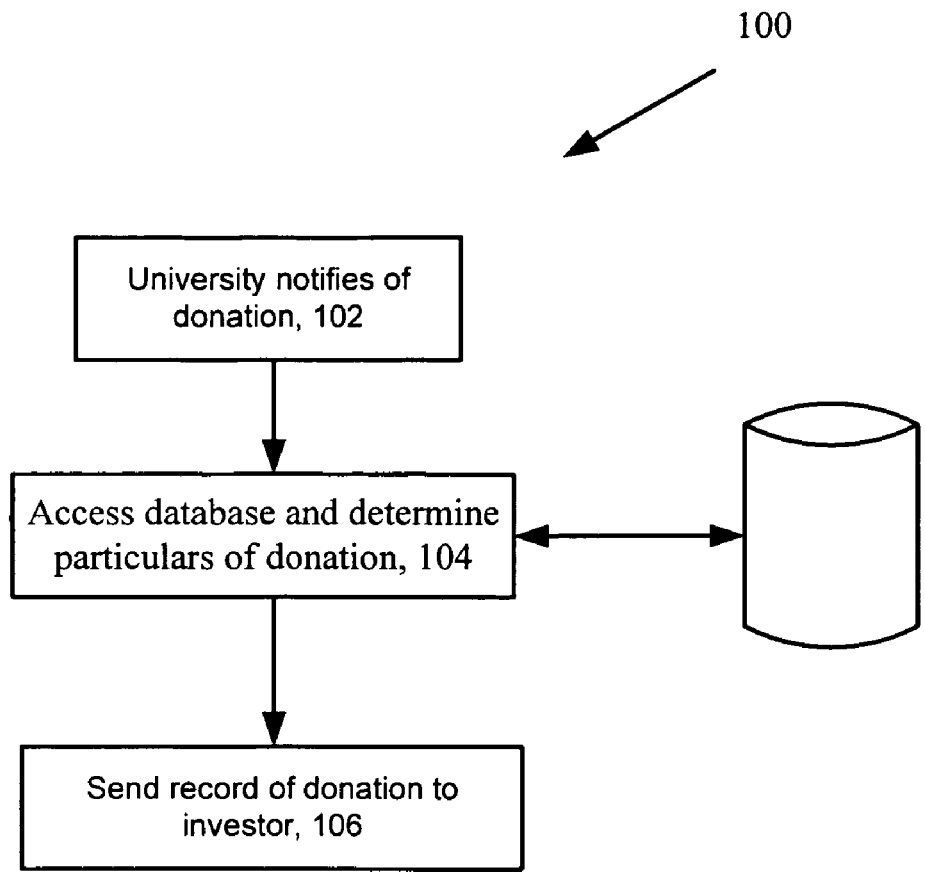
FIG. 5 is flow diagram of a process for reporting valuations for tax purposes.

Referring FIG. 5 a process 100 for donating and tracking of fund shares is shown. After the shares have been distributed to investors 14, the shares are tracked and information on the shares is periodically updated in a database or the like by a computer database program, bookkeeping program, or the like.

If the system is notified 102 from the university, either via mail, paper electronically and so forth, that a donation of shares was made, the system determines 104 the particulars of the donation. For example, the system will access the database and determine the current share balance of the donor investor and the current valuation of the donated shares, in order to determine a total value of the investor's donation. The system will compile 106 the data into a report or letter that is then sent 106 to the investor as a record of the donation for tax purposes.

Thus, in one embodiment, the system would access records pertaining to the investor 14, including contact information, fund information (if multiple funds are managed) and share information, e.g., the number of shares. The system would also access the latest valuation of those shares and determine a value of the fund shares for tax purposes. This could be automatically or manually recorded in e.g., a letter that is sent to the investor for the investor's tax records. Currently, in the United States, any single transaction that accounts for tax deductions in excess of $350 to the same organization must have written proof from the receiving organization. Either the fund 20 or the university generates this written proof and sends it to the investor.

The universities can redeem shares in the fund for cash after sufficient reserves are maintained to fund IP protection for committed research. When the fund closes due to either donation of all investor shares or a fund termination event, any balance of cash in the fund is given to the university.

The program 10 may be implemented, in part, by one or more programmable processors executing a computer program to perform functions of the program 10 by operating on input data and generating output. The program 10 may also be implemented, in part, using special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments of the invention, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method of the invention may use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments of the invention using web pages to allow a user to select options for a given component. Servers run on a variety of platforms, including UNIX machines, although other platforms, such as Windows 2000, Windows NT, Sun, Linux, and Macintosh may also be used. Computer users can view information available on servers or networks on the Web through the use of browsing software, such as Netscape Navigator, Microsoft Internet Explorer, Mosaic, or Lynx browsers. The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, a similar concept can be used with tax credits if a taxing authority specifically passed legislation or regulations to institute programs that issue such credits or the concept could be used to fund research itself in addition to providing funding for patent or other IP programs. In addition, agreements could be set up in which the shares held by investors can be donated to other non-profits, besides the non-profit that funded the research. In that situation, those other non-profits could redeem their shares for cash in a similar manner as the non-profit that funded the research does. Other embodiments are within the scope of the following claims.

What is claimed is:

1. A computer-implemented method comprising:
    establishing a fund to hold interests in intellectual properties associated with a non-profit organization;
    recording by a computer receipt of investments from investors to add to the fund, the investments funding acquisition of the intellectual properties by the non-profit organization;
    by a computer, storing information regarding the investments, rights in intellectual properties, and the investors into a database;
    calculating by the computer an initial valuation for a number of shares in the fund, the number of shares and value for the shares based on a value of investments received from investors; and
    recording by the computer a distribution of the shares in the fund, with a portion of the shares distributed to investors and a remaining portion distributed to the non-profit organization.

2. The method of claim 1 further comprises:
    recording by the computer a donation of shares in the fund to the non-profit;
    delivering a confirmation of the donation; and
    by the computer, storing information pertaining to the donation in the database, to reduce the number of shares in the fund held by investors and to increase the number of shares in the fund held by the non-profit organization.

3. The method of claim 1 wherein the intellectual properties are patents.

4. The method of claim 1 further comprising:
    by a computer executing a valuation program to value shares in the fund.

5. The method of claim 1 further comprising
    generating an agreement between the investors and the non-profit organization, the agreement being a legally binding document; and
    by a computer, storing the agreement in an electronic form in the database.

6. The method of claim 1 wherein providing the fund comprises providing a first fund to fund the acquisition of the intellectual properties by the non-profit organization over a specified first time period, the method further comprising
    providing additional funds that hold corresponding additional interests in additional potential intellectual properties of the non-profit organization to be obtained or obtained over corresponding, additional subsequent time periods; and
    by a computer, storing information pertaining to the first fund and the additional funds in the database.

7. The method of claim 1 further comprising generating reports that render information that comprises:
    the fund for which an investor has invested;
    a valuation of the shares in the fund;
    changes in ownership of shares in the fund; and
    profits generated by sales and/or licensing of intellectual properties in the fund.

8. The method of claim 1 further comprising;
    accrue tax deductions for the investor after the investor receives the shares in the fund.

9. The method of claim 1 further comprising:
    recording by the computer information related to a donation by the investors by shares in the fund immediately after investing by the investors;
    determining tax deductions based on the initial valuation of the shares in the fund that is related to the initial investment made by the investors.

10. The method of claim 1 wherein the interests in the potential intellectual properties comprise a right to receive royalties from licensing the acquired intellectual properties.

11. The method of claim 1 wherein the non-profit organization is a college or university.

12. The method of claim 1 wherein tax deductions can be taken by the investors after donating shares in the fund to the non-profit, based on a valuation that is determined at the time of donating the shares in the fund to the non-profit.

13. The method of claim 1 further comprising:
allowing, the investors to donate shares in the fund after investing by the investors, wherein tax deductions are based on an initial valuation of the shares in the fund that is related to the initial investment made by the investors.

14. The method of claim 1 further comprising:
allowing the investors to donate shares in the fund after acquisition of intellectual property assets in the fund and after a valuation of the fund that is subsequent to the initial evaluation of the shares in the fund, and wherein tax deductions are based on the subsequent valuation of the shares in the fund, which is related to a value ascribed to assets in the fund.

15. The method of claim 1 further comprising allowing the investors to donate the shares to the non-profit.

16. The method of claim 1, further comprises:
recording by computer information related to acquisition of intellectual property assets
subsequently valuing by the computer the shares of the fund according to a value of acquired intellectual property assets in the fund and remaining portions of investments received from investors; and
redeeming by the computer the shares in the fund based on the subsequent valuation of the shares in the fund.

17. The method of claim 16 wherein valuing comprises:
by a computer, determining a valuation of the shares in the fund based on intellectual property assets in the fund by executing a valuation model that applies valuation principles to the intellectual property assets in the fund; and
reporting information concerning the value of fund shares to the investors of the fund.

18. A system for administering a funding mechanism for funding IP acquisition for a non-profit, the system comprising:
at least one computer system comprising a processor and memory, the system configured to receive information regarding:
a fund to hold interests in potential intellectual properties associated with a non-profit organization;
investments from investors to add to the fund to fund the non-profit organization to acquire intellectual properties; the computer configured to:
calculate by the computer a valuation of shares in the fund based on investments received from investors and a number of shares;
receive by the computer information related to a donation to the non-profit from at least one investor of investor shares in the fund;
calculate by the computer based on the information a value of a tax deduction for the donation; and
store information regarding the valuation of shares in the fund, the number of shares and the investments, and rights in intellectual properties, and identifying information of the investors into a database.

19. The system of claim 18 wherein the system is further configured to calculate a valuation of the shares in the fund, is configured to calculate the valuation based on the assets in the fund executing a valuation model that applies valuation principles to the assets in the fund to determine the valuation of the fund shares.

20. The system of claim 19 wherein the system is further configured to report information concerning the value of fund shares to the investors of the fund.

21. The system of claim 18, further configured to:
record a redemption of the shares in the fund based on the valuation of the shares in the fund.

22. The system of claim 18, further configured to:
produce a confirmation of the donation; and
store information pertaining to the donation in the database, to reduce the number of shares in the fund held by investors.

23. The system of claim 18 wherein the intellectual properties are patents.

24. The system of claim 18, further configured to:
execute a valuation program to value shares in the fund.

25. The system of claim 18, wherein the fund is a first fund to fund the acquisition of the intellectual properties by the non-profit organization over a specified first time period, the system further configured to:
provide additional funds that hold corresponding additional interests in additional potential intellectual properties of the non-profit organization to be obtained or obtained over corresponding, additional subsequent time periods; and
store information pertaining to the first and additional funds in the database.

26. The system of claim 18, further configured to:
determine a valuation of the shares in the fund based on assets in the fund by execution of a valuation model by the system, the valuation model applying valuation principles to the assets in the fund; and
report information concerning the value of fund shares to the investors of the fund.

27. A computer program product tangibly embodied on a computer readable storage device, the computer program product comprising instructions stored on the storage device for administering a fund that funds a non-profit organization to acquire intellectual properties, the instructions executable by a processor to cause the processor to:
access information regarding a fund that holds interests in potential intellectual properties associated with a non-profit organization, investments from investors that are added to the fund to fund the non-profit organization to acquire the intellectual properties;
calculate a valuation of shares in the fund based on the investments received from investors and a number of shares in the fund;
receive information related to a donation to the non-profit from at least one investor of investor shares in the fund;
calculate based on the information related to the donation a value of a tax deduction for the donation; and
store information regarding the valuation of shares in the fund, the number of shares and the investments, and rights in intellectual properties, and identifying information of the investors into a database.

28. The computer program product of claim 27 further comprises instructions to:
report information concerning the value of fund shares to the investors of the fund.

29. The computer program product of claim 27 wherein instructions to calculate further comprise instructions to:
record information related to acquisition of intellectual property assets; and
execute a valuation model that applies valuation principles to the intellectual property assets in the fund to determine a subsequent valuation of the fund.

30. The computer program product of claim 27, further comprising instructions to:
redeem the shares in the fund based on the valuation of the shares in the fund.

31. The computer program product of claim 27, further comprising instructions to:

record a donation of shares in the fund to the non-profit;

deliver a confirmation of the donation; and store information pertaining to the donation in a database to reduce the number of shares in the fund held by investors.

32. The computer program product of claim 27 wherein the intellectual properties are patents.

33. The computer program product of claim 27, further comprising instructions to:

execute a valuation program to value shares in the fund.

34. The computer program product of claim 27 wherein the fund is a first fund to fund the acquisition of the intellectual properties by the non-profit organization over a specified first time period, further comprising instructions to:

provide additional funds that hold corresponding additional interests in additional potential intellectual properties of the non-profit organization to be obtained or obtained over corresponding, additional subsequent time periods; and store information pertaining to the first and additional funds in the database.

35. The computer program product of claim 27, further comprising instructions to:

determine a valuation of the shares in the fund based on assets in the fund by execution of a valuation model, the valuation model applying valuation principles to the assets in the fund; and report information concerning the value of fund shares to the investors of the fund.

* * * * *